(12) United States Patent
House

(10) Patent No.: US 9,181,955 B1
(45) Date of Patent: Nov. 10, 2015

(54) METHOD FOR REDUCING AERO CLEARANCES WITH A BALL BEARING TURBOCHARGER

(71) Applicant: BorgWarner Inc., Auburn Hills, MI (US)

(72) Inventor: Timothy House, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/625,095

(22) Filed: Feb. 18, 2015

(51) Int. Cl.
*F04D 29/051* (2006.01)
*F02B 37/00* (2006.01)
*F04D 17/10* (2006.01)
*F01D 25/16* (2006.01)

(52) U.S. Cl.
CPC ............. *F04D 29/051* (2013.01); *F01D 25/16* (2013.01); *F02B 37/00* (2013.01); *F04D 17/10* (2013.01)

(58) Field of Classification Search
CPC ..... F01D 25/16; F01D 25/162; F01D 25/164; F01D 25/18; F01D 25/183; F01D 25/186; F04D 29/051; F04D 17/10; F02B 37/00
See application file for complete search history.

(56) References Cited

U.S. PATENT DOCUMENTS

| 8,672,610 B2 * | 3/2014 | Berger et al. .................. 415/104 |
| 8,814,538 B2 * | 8/2014 | House et al. ................... 417/407 |
| 8,991,175 B2 * | 3/2015 | Fonville et al. .............. 60/605.3 |
| 2015/0049967 A1 * | 2/2015 | Fraser et al. .................. 384/100 |

FOREIGN PATENT DOCUMENTS

WO 2012058111 A2 5/2012

* cited by examiner

*Primary Examiner* — Dwayne J White
*Assistant Examiner* — William Grigos
(74) *Attorney, Agent, or Firm* — BrooksGroup

(57) ABSTRACT

A product and method for use with a turbocharger system may include a housing with a shaft rotatably supported by the housing. The shaft may extend in an axial direction. A bearing assembly may support the shaft in the housing. A wheel may be connected to the shaft and may rotate relative to the housing. A clearance opening may be defined in the axial direction between the wheel and the housing. A thrust washer may be engaged with the bearing assembly. The thrust washer may have an outer circumference and may be movable relative to the housing. An efficiency washer may be disposed around the outer circumference of the thrust washer and may determine the clearance opening by defining a space within which the thrust washer moves relative to the housing in the axial direction.

15 Claims, 2 Drawing Sheets

METHOD FOR REDUCING AERO CLEARANCES WITH A BALL BEARING TURBOCHARGER

TECHNICAL FIELD

The field to which the disclosure generally relates includes turbocharger systems for use with internal combustion engines and in particular, includes turbocharger design and construction to address aero clearances.

BACKGROUND

A turbocharger for use with an internal combustion engine may typically include a compressor that may be driven by a turbine or other rotation imparting device. The turbine may have a wheel connected to a compressor wheel by a common shaft that is supported for rotation by bearings. The bearing may be disposed in a housing that is situated between the turbine and the compressor. The shaft, the turbine wheel and the compressor wheel may rotate at speeds that approach hundreds of thousands of revolutions per minute. In addition, the turbine may be exposed to high temperature exhaust gases and the resulting heat may be transferred to other system components. Under these harsh, and increasingly demanding operating conditions, the lifespan of a turbocharger is expected to match that of the engine with which it operates. To accomplish that challenge, the design of a turbocharger and its components must be robust to survive as expected, while still being cost effective and competitive.

SUMMARY OF ILLUSTRATIVE VARIATIONS

According to a number of variations a product for use with a turbocharger system may include a housing with a shaft rotatably supported by the housing. The shaft may extend in an axial direction. A bearing assembly may support the shaft in the housing. A wheel may be connected to the shaft and may rotate relative to the housing. A clearance opening may be defined in the axial direction between the wheel and the housing. A thrust washer may be engaged with the bearing assembly. The thrust washer may have an outer circumference and may be movable relative to the housing. An efficiency washer may be disposed around the outer circumference of the thrust washer and may determine the clearance opening by defining a space within which the thrust washer moves relative to the housing in the axial direction.

A number of other variations may include a method of improving the efficiency of a turbocharger assembly that has a ball bearing assembly supporting a rotor on a housing. The rotor may be comprised of a compressor wheel, a turbine wheel and a shaft connecting the compressor wheel to the turbine wheel. A thrust washer may be fixed to the ball bearing assembly. A first variable space may be provided between the thrust washer and a first surface of the housing. The first space may be filled with a lubricant. An anti-rotation spacer may be fixed in the housing against the efficiency washer so that a second surface of the anti-rotation spacer is positioned by the efficiency washer on an opposite side of the thrust washer from the first surface to define a second variable space between the thrust washer and the second surface. The second surface may be filled with lubricant. An efficiency washer may be provided with a selected thickness. A distance between the first and second surfaces may be set to limit movement of the thrust washer relative to the housing, the distance being set by the thickness of the efficiency washer.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
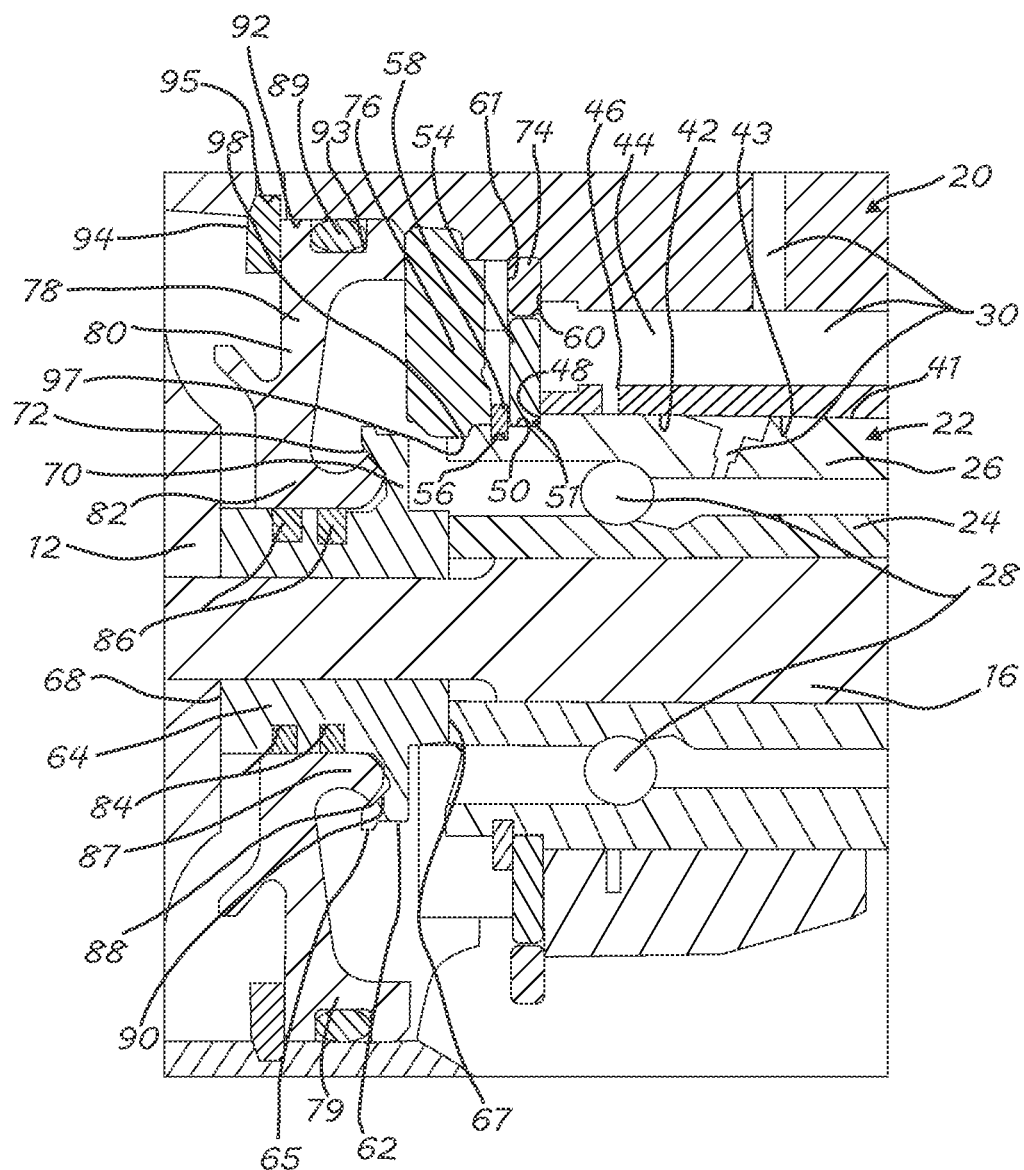
FIG. 1 is a cross sectional illustration of part of a turbocharger assembly with aero clearance control according to a number of variations.
Figure 2:
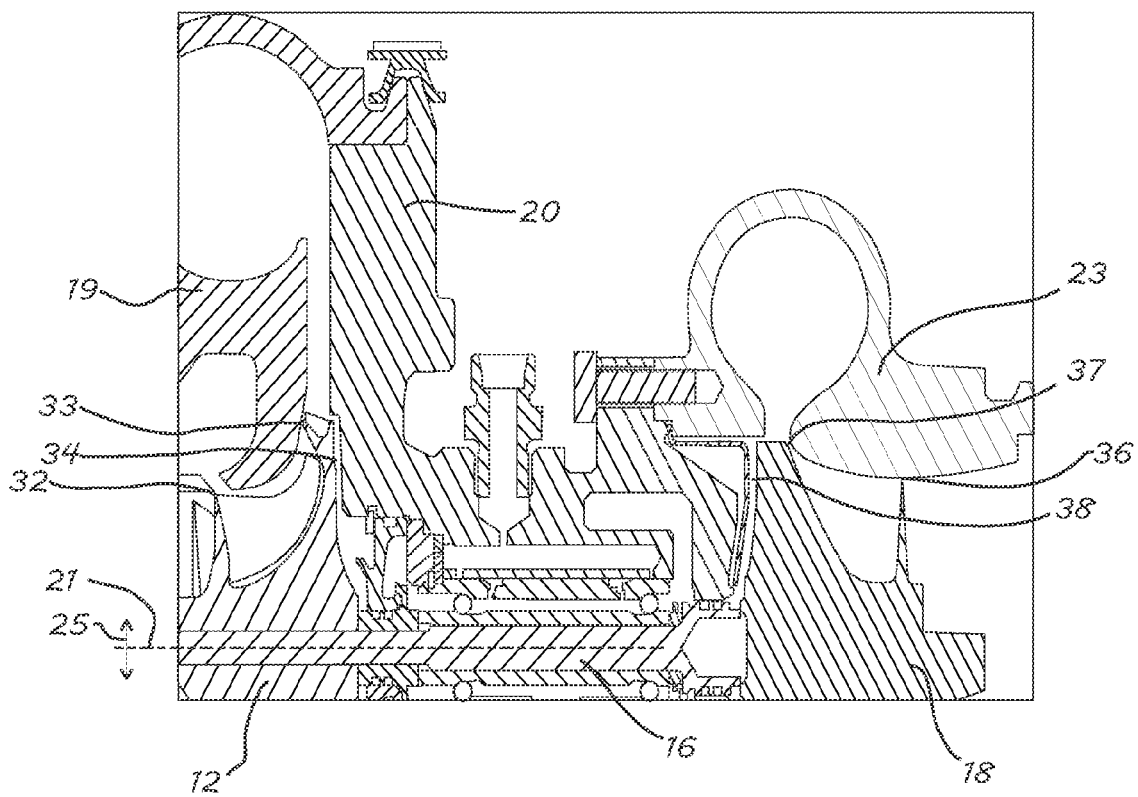
FIG. 2 is a fragmented illustration of part of a turbocharger assembly with aero clearance control according to a number of variations.

Illustrated in FIG. 1 is the part of a turbocharger assembly in the area of the compressor wheel 12. The compressor wheel 12 may be connected to a shaft 16 which may be driven by a turbine wheel 18 as illustrated in FIG. 2. A central housing referred to as the bearing housing 20 may be disposed between the compressor wheel 12 and the turbine wheel 18 and may support the shaft 16 through a bearing assembly 22. The bearing assembly 22 may be of the ball bearing type and may include an inner race 24 that is engaged with the shaft 16 to rotate therewith and may include an outer race 26 that is engaged with the bearing housing 20 and is generally rotationally stationary relative thereto. The inner race 24 may be rotationally supported in the outer race 26 by a plurality of rolling elements that may be balls 28. The bearing assembly 22 may be lubricated with a lubricant supplied through a lubrication circuit 30. The inner and outer races may move together within the bearing housing 20 both axially and radially a controlled amount.

The rotor assembly comprising the compressor wheel 12, the shaft 16 and the turbine wheel 18 may have a center of rotation generally about an axis 21 with some variation. The axial direction is along a line parallel to or on the axis 21. The radial direction 25 is on a line directed at or away from the axis 21 and generally at ninety degrees relative thereto. The compressor wheel 12 and the turbine wheel 18 may have aero clearances between the wheels and the compressor and turbine end housing sections 19, 23 (shown in FIG. 2), that are preferably minimized for efficiency. Also shown in FIG. 2, the compressor wheel 12 may have a radial aero clearance 32, an axial aero clearance 34 toward the bearing housing 20 and an axial aero clearance 33 toward the compressor end housing section 19. Similarly, the turbine wheel 18 may have a radial aero clearance 36, an axial aero clearance 38 toward the bearing housing 20, and an axial aero clearance 37 toward the turbine end housing section 23. The ability to maintain a tight clearance control is a factor of the individual elements of the assembly that are engaged together to locate the rotating wheels 12, 18 particularly relative to the end housing sections 19, 23. Aero clearance control may be an important factor in wheel efficiency maximization.

As shown in FIG. 1, the bearing housing 20 may have a central bore 42 within which the outer race 26 of the bearing assembly 22 may be received. A clearance of approximately 0.050 millimeters may be provided between the outer surface 41 of the outer race 26 and the wall 43 of the central bore 42 formed by the bearing housing 20. The lubrication circuit 30 may include an axial bore 44 with a number of radial bores 46 that extend between the axial bore 44 and the central bore 42. An oil film may thereby be provided between the wall 43 and the outer race 26 to provide squeeze film dampening of vibration between the outer race 26 and the bearing housing 20.

The outer race 26 may have an annular shoulder 48 formed by an axial extending surface 50 and may have a radial extending surface 51. An annular groove may be formed by the axial extending surface 50 adjacent the radial extending surface 51. A thrust washer 54 may be positioned on the shoulder 48 against the radial extending surface 51. An annular groove 56 may be formed in the outer surface 41 of the outer race 26 adjacent the shoulder 48. A snap ring 58 may be positioned in the groove 56 and may retain the thrust washer 54 on the shoulder 48 against radial extending surface 51 so that the outer race 26 and the thrust washer 54 move together. The thrust washer 54 may transfer axial loads from the outer race 26 to the radial extending surface 60 of the bearing housing 20 or to the surface 61 of an anti-rotation spacer 76. In each case a clearance is provided between the thrust washer and the surfaces 60, 61 that may be filled with lubrication oil to provide squeeze film damping between the bearing assembly 22 and the bearing housing 20.

The inner race 24 may be fit to the shaft 16 so that the two rotate together. The inner race 24 may be located relative to the shaft 16 by a flinger ring 62 that is positioned against the compressor wheel 12, so that the inner race 24 and flinger ring 62 may be clamped toward a shoulder on the shaft as shown in FIG. 2.

The flinger ring 62 may have a hollow cylindrical section 64, through which the shaft 16 is fit and a radially projecting flinger section 65. The end 67 of the cylindrical section 64 may be positioned against the inner race 24 and the end 68 may be positioned against the compressor wheel 12. The flinger section 65 may have a radially extending section 70 with an angled annular surface 72 that may be directed generally radially inward. The flinger ring 62 also rotates with the shaft 16.

A series of elements may be fixed to the bearing housing 20 and may include an efficiency washer 74, an anti-rotation spacer 76 and an insert 78. The insert 78 may include a circumferential wall 79, and a spaced apart axial extending wall 82 connected to the circumferential wall 79 by a radially extending wall 80. The circumferential wall 79 may be fit in an opening 92 in the bearing housing 20 and may include an annular groove 93 in its outer surface. A seal 89 may be positioned in the groove 93. The axial extending wall 82 may be disposed around the cylindrical section 64 of the flinger ring 62. The cylindrical section 64 may include grooves 84 that may contain piston type sealing rings 86 disposed between the relatively rotating surfaces. The axial extending wall 82 may terminate in an arcuate section 87 with an annular ridge 88 facing radially outward and an angled surface 90 facing generally outward and mating with the angled annular surface 72 of the flinger ring 62.

The insert 78 may be retained in the opening 92 by a snap ring 94 that may be snapped into a groove 95 in the bearing housing 20. The circumferential wall 79 may be positioned against the anti-rotation spacer 76. The anti-rotation spacer 76 may be secured in the opening 92 and may have a flat surface 97 that is aligned with a flat surface 98 of the outer race 26 to secure the outer race 26 against rotation, but with clearance to allow the outer race 26 to radially float in the oil film around its outer circumference. The surface 61 of the anti-rotation spacer 76 may be positioned against the efficiency washer 74. The efficiency washer 74 may be annular and may be positioned around the outer circumference of the thrust washer 54. The efficiency washer 74 may be clamped between the surface 61 of the anti-rotation spacer 76 and the radially extending surface 60 of the bearing housing 20. No clearance spaces need be provided between the efficiency washer 74 and either the anti-rotation spacer 76 or the bearing housing 20. The efficiency washer 74 thus locates the anti-rotation spacer 76 in position. The location of the surface 61 relative to the housing surface 60 is critical in maintaining the axial location of the rotating elements, and so the ability to maintain tight clearances in locating the anti-rotation spacer 76, and its surface 61 in particular are important. In this regard, the efficiency washer 74 defines the distance between the surfaces 60 and 61.

The efficiency washer may include ground surfaces that allows for a thickness tolerance of plus or minus 0.010 millimeter. This precise characteristic means that the rotating features may be precisely located in the axial direction. As a result, the axial aero clearances of both the compressor wheel 12 and the turbine wheel 18 may be reduced as compared to prior assemblies. Clearance of less than 0.10 millimeter may be provided between the thrust washer 54 and both the anti-rotation spacer 76 and the efficiency washer 74 to ensure radial movement of the outer race 26 to reduce vibration transfer between the bearing assembly 22 and the bearing housing 20. More specifically, as axial force is applied by the rotating elements in the direction of the compressor wheel 12, the shoulder 48 may cause the thrust washer 54 to apply force through the oil film and onto surface 61 of the anti-rotation spacer 76. The force is transferred through the anti-rotation spacer to the insert 78 and then through the snap ring 94 to the bearing housing 20. As axial force is applied by the rotating elements in the direction of the turbine wheel 18, the force is transferred through the thrust washer snap ring 58 into the thrust washer 54 and then through the oil film onto surface 60 and into the bearing housing 20. By maintaining tight clearances in locating the surface 61, endplay of the rotating elements may be reduced and the axial aero clearance at the compressor wheel 12 and the turbine wheel 18 may be reduced.

Through the variants, including the products and methods described herein, the axial aero clearances 33, 37 of the compressor wheel 12 and the turbine wheel 18 may be controlled with precision. The description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

The following description of variations is merely illustrative in nature and is in no way intended to limit the scope of the invention, its application, or uses.

Variation 1 may include a product for use with a turbocharger system and may include a housing with a shaft rotatably supported by the housing. The shaft may extend in an axial direction. A bearing assembly may support the shaft in the housing. A wheel may be connected to the shaft and may rotate relative to the housing. A clearance opening may be defined in the axial direction between the wheel and the housing. A thrust washer may be engaged with the bearing assembly. The thrust washer may have an outer circumference and may be movable relative to the housing. An efficiency washer may be disposed around the outer circumference of the thrust washer and may determine the clearance opening by defining a space within which the thrust washer moves relative to the housing in the axial direction.

Variation 2 may include a product according to variation 1 wherein an anti-rotation spacer may be engaged between the shaft and the efficiency washer. The anti-rotation spacer may inhibit rotation of at least a part of the bearing assembly relative to the housing.

Variation 3 may include a product according to variation 2 wherein an insert may be engaged between the housing and the shaft. The insert may be fixed in the housing in the axial direction between a retainer and the anti-rotation spacer.

Variation 4 may include a product according to variation 3 wherein a flinger ring may be fixed to the shaft and may engage the insert. The flinger ring may rotate relative to the insert.

Variation 5 may include a product according to any of variations 1 through 4 wherein the bearing assembly may comprise an outer race supporting an inner race through a plurality of rolling elements. Movement of the bearing assembly may be limited in the axial direction by the position of the anti-rotation spacer.

Variation 6 may include a product according to any of variations 1 through 5 and may include an end section of the housing covering the wheel. The clearance opening may be between the compressor wheel and the end section.

Variation 7 may include a method of improving the efficiency of a turbocharger assembly that has a ball bearing assembly supporting a rotor on a housing. The rotor may be comprised of a compressor wheel, a turbine wheel and a shaft connecting the compressor wheel to the turbine wheel. A thrust washer may be fixed to the ball bearing assembly. A first variable space may be provided between the thrust washer and a first surface of the housing. The first space may be filled with a lubricant. An anti-rotation spacer may be fixed in the housing against the efficiency washer so that a second surface of the anti-rotation spacer is positioned by the efficiency washer on an opposite side of the thrust washer from the first surface to define a second variable space between the thrust washer and the second surface. The second surface may be filled with lubricant. An efficiency washer may be provided with a selected thickness. A distance between the first and second surfaces may be set to limit movement of the thrust washer relative to the housing, the distance being set by the thickness of the efficiency washer.

Variation 8 may include a method according to variation 7 wherein the efficiency washer may be provided with an open center. The thrust washer may be positioned in the open center.

Variation 9 may include a method according to variation 7 or 8 and may include an anti-rotation spacer that may engage the ball bearing assembly to limit rotation of at least a part of the ball bearing assembly. The efficiency washer may be clamped between the anti-rotation spacer and the housing.

Variation 10 may include a method according to any of variations 7 through 9 and may include clamping the efficiency washer between the anti-rotation spacer and the housing so that the efficiency washer is positioned directly against both the anti-rotation spacer and the housing.

Variation 11 may include a method according to any of variations 7 through 10 wherein the efficiency washer may be ground to set the thickness within a tolerance of approximately minus 0.010 millimeters to plus 0.010 millimeters.

Variation 12 may include a turbocharger assembly for use with an internal combustion engine, and may include a housing having a first surface, a compressor end section, and a turbine end section. A shaft may extend through at least part of the housing in an axial direction. The shaft may have a first end and a second end. A compressor wheel may be connected to the shaft near the first end. A first axial clearance may be defined between the compressor wheel and the compressor end section of the housing. A turbine wheel may be connected to the shaft near the second end. A second axial clearance may be defined between the turbine wheel and the turbine end section of the housing. A bearing assembly may have an outer race and an inner race. The bearing assembly may be positioned in the housing, supporting the shaft. The shaft may extend through the inner race. A thrust washer may be fixed to the outer race. The thrust washer may have a first side and a second side. The first side may face in the axial direction toward the first surface. An efficiency washer may have an open center and the thrust washer may be positioned in the open center. An anti-rotation spacer may have a second surface. The anti-rotation spacer may be positioned in the housing and may engage the outer race to inhibit rotation of the outer race. The second surface of the anti-rotation spacer may be clamped against the efficiency washer, setting a position of the second surface in a spaced apart relationship with the first surface. The first and second surfaces may be spaced apart a distance in the axial direction. The distance may be equal to the thickness of the efficiency washer. The second side of the thrust washer may face in the axial direction toward the second surface.

Variation 13 may include a turbocharger assembly according to variation 12 and may include an insert engaged between the housing and the shaft. The insert may be fixed in the housing in the axial direction between a retainer and the anti-rotation spacer. The insert, the anti-rotation spacer and the efficiency washer may be clamped between the retainer and the first surface.

Variation 14 may include a turbocharger assembly according to variation 12 or 13 wherein an oil film may be positioned between the first side of the thrust washer and the first surface, and between the second side of the thrust washer and the second surface. The oil film may dampen vibrations between the bearing assembly and the housing.

Variation 15 may include a turbocharger assembly according to any of variations 12 through 14 wherein the efficiency washer may have a thickness within a tolerance of approximately minus 0.010 millimeters to plus 0.010 millimeters.

The above description of select variations within the scope of the invention is merely illustrative in nature and, thus, variations or variants thereof are not to be regarded as a departure from the spirit and scope of the invention.

What is claimed is:

1. A product for use with a turbocharger system comprising:
   a housing;
   a shaft rotatably supported by the housing, the shaft extending in an axial direction;
   a bearing assembly supporting the shaft in the housing;
   a wheel connected to the shaft and rotatable relative to the housing wherein a clearance opening is defined in the axial direction between the wheel and the housing;
   a thrust washer engaged with the bearing assembly, the thrust washer having an outer circumference, the thrust washer movable relative to the housing;
   an efficiency washer disposed around the outer circumference of the thrust washer, the efficiency washer determining the clearance opening by defining a space within which the thrust washer moves relative to the housing in the axial direction.

2. The product according to claim 1 further comprising an anti-rotation spacer engaged between the shaft and the efficiency washer, the anti-rotation spacer inhibiting rotation of at least a part of the bearing assembly relative to the housing.

3. The product according to claim 2 further comprising an insert engaged between the housing and the shaft, the insert fixed in the housing in the axial direction between a retainer and the anti-rotation spacer.

4. The product according to claim 3 further comprising a flinger ring fixed to the shaft and engaging the insert wherein the flinger ring rotates relative to the insert.

5. The product according to claim 1 wherein the bearing assembly comprises an outer race supporting an inner race through a plurality of rolling elements, and wherein movement of the bearing assembly is limited in the axial direction by the position of the anti-rotation spacer.

6. The product according to claim 1 further comprising an end section of the housing covering the wheel, and wherein the clearance opening is between the wheel and the end section of the housing.

7. A method of improving the efficiency of a turbocharger assembly that has a ball bearing assembly supporting a rotor on a housing, the rotor comprised of a compressor wheel, a turbine wheel and a shaft connecting the compressor wheel to the turbine wheel, the method comprising:
    fixing a thrust washer to the ball bearing assembly;
    providing a first variable space between the thrust washer and a first surface of the housing;
    filling the first space with a lubricant;
    providing an efficiency washer with a selected thickness;
    fixing an anti-rotation spacer in the housing against the efficiency washer so that a second surface of the anti-rotation spacer is positioned by the efficiency washer on an opposite side of the thrust washer from the first surface to define a second variable space between the thrust washer and the second surface;
    filling the second surface with lubricant; and
    setting a distance between the first and second surfaces to limit movement of the thrust washer relative to the housing, the distance being set by the thickness of the efficiency washer.

8. The method according to claim 7 further comprising the steps of: providing the efficiency washer with an open center and positioning the thrust washer in the open center.

9. The method according to claim 7 further comprising the step of providing an anti-rotation spacer that engages the ball bearing assembly to limit rotation of at least a part of the ball bearing assembly, and clamping the efficiency washer between the anti-rotation spacer and the housing.

10. The method according to claim 7 further comprising the step of clamping the efficiency washer between the anti-rotation spacer and the housing so that the efficiency washer is positioned directly against both the anti-rotation spacer and the housing.

11. The method according to claim 7 further comprising the step of grinding the efficiency washer to set the thickness within a tolerance of approximately minus 0.010 millimeters to plus 0.010 millimeters.

12. A turbocharger assembly for use with an internal combustion engine comprising:
    a housing that has a first surface, a compressor end section, and a turbine end section;
    a shaft extending through at least part of the housing, the shaft extending in an axial direction, the shaft has a first end and a second end;
    a compressor wheel connected to the shaft near the first end wherein a first axial clearance is defined between the compressor wheel and the compressor end section;
    a turbine wheel connected to the shaft near the second end wherein a second axial clearance is defined between the turbine wheel and the turbine end section;
    a bearing assembly that has an outer race and an inner race, the bearing assembly positioned in the housing and supporting the shaft, wherein the shaft extends through the inner race;
    a thrust washer fixed to the outer race, the thrust washer having a first side and a second side, the first side facing in the axial direction toward the first surface;
    an efficiency washer having an open center wherein the thrust washer is positioned in the open center;
    an anti-rotation spacer that has a second surface, the anti-rotation spacer positioned in the housing, the anti-rotation spacer engaging the outer race to inhibit rotation of the outer race, and the second surface of the anti-rotation spacer clamped against the efficiency washer, setting a position of the second surface in a spaced apart relationship with the first surface, the first and second surfaces spaced apart a distance in the axial direction, the distance equal to the thickness of the efficiency washer;
    wherein the second side of the thrust washer faces in the axial direction toward the second surface.

13. The turbocharger assembly according to claim 12 further comprising an insert engaged between the housing and the shaft, the insert fixed in the housing in the axial direction between a retainer and the anti-rotation spacer, so that the insert, the anti-rotation spacer and the efficiency washer are clamped between the retainer and the second surface.

14. The turbocharger assembly according to claim 12 wherein an oil film is positioned between the first side of the thrust washer and the first surface and between the second side of the thrust washer and the second surface so that the oil film dampens vibrations between the bearing assembly and the housing.

15. The turbocharger assembly according to claim 12 wherein the efficiency washer has a thickness within a tolerance of approximately plus 0.010 millimeters to minus 0.010 millimeters.

* * * * *